United States Patent [19]
Wegner

[11] Patent Number: 5,922,348
[45] Date of Patent: Jul. 13, 1999

[54] INTEGRAL SKIN FOAMS

[75] Inventor: Gene Wegner, Scottsdale, Ariz.

[73] Assignee: Intercool Energy Corp., Latham, N.Y.

[21] Appl. No.: 08/964,066

[22] Filed: Nov. 4, 1997

[51] Int. Cl.$^6$ ...................................................... A61F 13/00
[52] U.S. Cl. ............................................. 424/443; 424/449
[58] Field of Search ..................... 424/443, 449; 521/51, 159, 170, 174, 176

[56] References Cited

U.S. PATENT DOCUMENTS

| | | | |
|---|---|---|---|
| 5,091,436 | 2/1992 | Frisch et al. ............................. | 521/137 |
| 5,283,003 | 2/1994 | Chen ........................................ | 252/350 |
| 5,439,948 | 8/1995 | De Vos et al. ........................... | 521/159 |
| 5,633,289 | 5/1997 | Nakamura et al. ...................... | 521/51 |

OTHER PUBLICATIONS

G. Burkhart and H. Schator, "Open Cell Rigid Polyurethane Foam by Means of An Additive Approach", Goldschmidt Chem, pp. 310–315.

*Primary Examiner*—José G. Dees
*Assistant Examiner*—Kathryne E. Shelborne
*Attorney, Agent, or Firm*—Helfgott & Karas, P.C.

[57] ABSTRACT

A composition for an integral skin foam which comprises an isocyanate component, a blended polyol component, a surface active agent and a blowing agent with a cell regulator is disclosed.

28 Claims, No Drawings

INTEGRAL SKIN FOAMS

FIELD OF THE INVENTION

The present invention relates to a novel composition for a virtually shrink-free polyurethane integral skin foam and to a process for its preparation. Furthermore, the present invention utilizes a blowing agent with no known ozone depletion potential.

BACKGROUND OF THE INVENTION

Polyurethane integral skin foams, both flexible and semi-rigid, are known in the art. Such class of foams are discussed, for example, in U.S. Pat. No. 5,633,289. In U.S. Pat. No. 5,633,289, there is disclosed a process for molding a semi-rigid integral skin foam with the skin forming process taking place close to the wall surface of the mold having a low degree of foaming and a core region having a high degree of foaming. A polyurethane material for molding such a foam, which is suitable for reaction injection molding, is also disclosed.

U.S. Pat. No. 5,283,003 discloses components, i.e. blowing agents, for integral skin foams having high dimensional stability and minimal or no shrinkage. The components include methyl formate with at least one five carbon member hydrocarbon, such as n-pentane, isopentane and cyclopentane, and a chlorinated alkane such as methylene chloride. Methyl formate, when used as a blowing agent by itself, is said to have demonstrated poor dimensiional stability and it has a foam shrinkage of more than 10 percent. Therefore, according to U.S. Pat. No. 5,283,003, methyl formate can only be used in blends with other blowing agents to produce non-shrinking foams.

U.S. Pat. No. 5,439,948 discloses a process for the preparation of a prepolymer product which comprises reaction of a polyisocyanate composition with an isocyanate-reactive composition in the presence of a blowing agent and in the presence of an inert, organic liquid which is insoluble in the reaction mixture. The inert, organic liquid, identified in this patent as highly fluorinated or perfluorinated compounds, are said to be used at significantly reduced quantities in prepolymer compostions having a synergistic effect. The foams produced by this process are said to be characterized by finer cell structure and improved thermal insulation properties. Suitable blowing agents are disclosed as alkyl alkanoates, e.g. methyl and ethyl formate. However, the use of blowing agents in this patent involves the addition of another component, namely an inert, organic liquid in order to achieve certain physical properties.

The industry is currently using pentanes to make an integral skin foam with a fine cell structure and no shrinkage. The handling of the highly flammable pentanes requires additional safety features. In fact, the dangers associated with such pentane-based integral skin foams has been widely publicized, in such industry publications as *Technology News* and *Urethanes Report*. What is missing in the art and is now provided in the present invention, is an integral skin foam having a stabilized cell structure and no shrinkage.

SUMMARY OF THE INVENTION

The present invention is directed to a composition for an integral skin foam which comprises an an isocyanate component, a blended polyol component, a surface active agent and a blowing agent with a cell regulator. The surface active agent comprises a silicone or non-silicone surfactant. Optionally, a catalyst for urethane formation may also be employed.

DETAILED DESCRIPTION OF THE INVENTION

The integral skin foams produced by the compositions and methods of the present invention, uniquely stabilize cell structure and prevent shrinkage by the application of methyl and/or ethyl formate with a small amount of a cell regulator. Preferably, the cell regulator is a non-potent polysiloxane-polyether-copolymer. The blowing agent with cell regulator can be added to the isocyanate component or the polyol component of the present composition and still experience universally good results. Most preferably, the blowing agent is methyl formate, but ethyl formate may also be successfully utilized. Methyl and/or ethyl formate are blowing agents with no known ozone depletion potential. It is preferred that the cell regulator and blowing agent are present in a proportioned amount ranging from about 95:5 to about 99:1. It is also preferred that the polyol component comprises from about 50 percent to about 60 percent of the composition; the isocyanate component comprises from about 40 percent to about 50 percent of the composition and the cell regulator and blowing agent comprise from about 1 percent to about 15 percent of said composition.

By the present invention, it has been discovered that the combination of methyl and/or ethyl formate and a commercially available non-potent polysiloxane-polyether-copolymer compound resulted in a high dimensional stability flexible integral skin foam product with minimal or no shrinkage. An example of such a cell regulator is TEGOSTAB B® 8470 available from Goldschmidt Chemical Corporation. TEGOSTAB B® 8470, a compounded surfactant, concentrates on nucleation and lacks emulsification properties. This is contrary to the first role of surfactants which is the dispersion and emulsification of the reactants. The second role is the stabilization of the bubbles in the rising foam until enough polymerization takes place so it becomes self-supporting and the cell walls are resistant to opening. This stabilization is critical to prevent any coalescence of bubbles. Most commercially available silicone surfactants are classified as polysiloxane-polyether-copolymers. Polysiloxanes with higher chain lengths give rise to higher surface activity. The compatability of the raw materials is controlled by the polyether chain. The solubility can be improved by increasing the chain length, but this results in reduced surface activity. The molecular weight, the polysiloxane/polyether ratio, the ethylene oxide/propylene oxide content in the polyethers and nature of the polyether cap (hydroxyl terminated or not) are critical to providing the balanced efficiency of silicone surfactants.

A paper presented at the 35th ANNUAL POLYURETHANE TECHNICAL MARKETING CONFERENCE held on Oct. 9–12, 1994, described an *Open Cell Rigid Polyurethane Foam by Means of an Additive Approach* (G. Burkhart and H. Schator of Goldschmidt AG). Although the paper deals exclusively with rigid foams, the same mechanism of the novel technique of cell opening is applicable to an integral skin foam. Cell regulation is cell opening and is described as a time controlled defoaming process. The goal is to cause the cell walls to drain into the struts when maximum foam expansion is almost reached and a sufficient degree of foam stability by polymerization is imparted. At this point in time, stabilization by the Gibbs-Marangoni effect and by the expansion itself is no longer required and the cell walls might break, leaving the foam structure stable. An ongoing thinning of the cell walls is a basic condition for controlled, rapid cell opening. The defoaming process can actually be described by a number of consecutive steps, including the antifoam droplets reaching the surface, bridging the foam lamella, dewetting of the antifoamer, and breaking the gas bubble. The difficulty in a polyurethane foam system is the need for a foam stabilizer to allow the foam to develop and an active antifoaming material to dominate over the foam stabilizer at the end of the expansion.

While the use of a silicone surfactant is preferred, it will be apparent to one skilled in the art that other surfactants may be utilized equally well in the present invention, including surfactants which are nonsilicone polyethers.

In the present invention, the addition of the methyl and/or ethyl formate blend to the polyol component is most preferred. The polyol portion is the more viscous portion of the two-component formulation and the addition of the methyl and/or ethyl formate, which acts as a solvent, reduces the polyol viscosity and balances the system. Moreover, a stoichiometric balance of the OH groups (polyol) versus the NCO groups (isocyanate) is achieved more easily in a two-component system having the blowing agent, i.e., methyl and/or ethyl formate, in the polyol portion.

EXAMPLE 1

The following procedure was used to prepare a flexible integral skin foam.

A mixture was prepared containing about 55 percent of a polyol blend including about 4 percent of the blowing agent blend (a methyl formate/polysiloxane-polyether copolymer blend) and about 45 percent of an isocyanate component. The foam was handbatched according to conditions well-known to those skilled in the art. This mixture was then discharged into a mold and subjected to a short cure cycle to produce the finished foam product.

The appearance of the molded foam product was satisfactory with a uniform cell structure and a tough outer foam skin. There was no evidence of foam shrinkage after completion of the cure cycle. The free rise density of the foam was 80 kg/m$^3$ and the molded foam density was 190 kg/m$^3$.

EXAMPLE 2

A mixture was prepared containing the same B-component composition as disclosed in Example 1 except the blowing agent blend was about 10 percent. The isocyanate component was the same as in Example 1.

The foam was compounded in a production type facility and poured into a headrest mold designed for a hot tub application. The appearance of the part was excellent with an average skin thickness of about 0.25 cm; the free rise foam density was 72 kg/m$^3$ and the molded foam density was 128 kg/m$^3$.

The 55 percent B-component composition contains polyols, such as Voranol 4148, a high molecular weight ethylene oxide capped polyether polyol (trademark Dow Chemical Company) an additional low molecular weight crosslinker such as Voranol 490 (trademark Dow Chemical Company), a short-chain diol such as 1,4 butane diol, a silicone surfactant such as Dow Chemical's DC 193, a catalyst such as Dabco 33LV (trademark Air Products), water and the blowing agent blend. The B-component composition can range from about 53 percent (110 index) to about 57 percent (90 index) with the blowing agent blend ranging from about 2 percent to about 20 percent based on the B-component.

The 45 percent A-component contains an isocyanate such as Isonate 2143L (trademark Dow Chemical), which is a modified MDI (4,4'-diphenylmethane diisocyanate). The A-component can range from about 43 percent (90 index) to about 47 percent (110 index).

Any suitable organic polyisocyanate may be employed in the formation of the integral skin polyurethane compositions via the one-shot method. Prepolymers, prepared by methods well-known in the art, may also be employed as A-components in the present invention.

Flame retardants may also be added to the composition without distracting from the scope of this invention. They may include inorganic flame retardants, reactive-type flame retardants, such as bromine containing polyols, and non-reactive organophosphorus plasticizers and blends thereof.

The blowing agent blend of this invention becomes non-flammable when combined with about 75 percent of a polyol, such as Dow Chemical's Voranol 4148 (the blend is totally miscible with the polyol). The combination most preferred is 75/25 percent polyol/methyl formate blend.

EXAMPLE 3

A B-component composition was prepared using 65.6 percent of Voranol 4148 polyol, 3.6 percent of Voranol 490 polyol, 3.6 percent of 1,4 butane diol, 0.3 percent of DC 5258 silicone surfactant, 0.6 percent of Dabco 33LV catalyst, 0.4 percent of Polycat 41 catalyst, and 5.8 percent of methyl formate. To part B was added the A-component, such as Isonate 2143L isocyanate, using the hand batching practice. The resulting foam produced an unacceptable foam shrinkage after the completion of the cure cycle.

The identical aforementioned B-component composition was prepared as previously outlined except that the methyl formate was replaced with 5.8 percent of the methyl formate/cell regulator blend. The mixture was reacted with the A-component producing an integral skin foam which was allowed to cure properly. In this example, the resulting foam provided satisfactory resistance to shrinkage.

The present invention is merely illustrated by the above disclosure and examples and is not meant to be limited thereby. The scope of the present is intended to include obvious modifications which would be apparent to one skilled in the art.

We claim:

1. An integral skin foam composition which comprises: an isocyanate composition component; a blended polyol component; a surface active agent, and a blowing agent component which comprises a non-potent polysiloxane-polyether copolymer cell regulator and a blowing agent, wherein the method for the preparation of the integral skin foam composition comprises
    a). mixing a silicone surfactant, an isocyanate component and a blended polyol component, and
    b). combining the mixture of (a.) With a blowing agent component comprising a blowing agent and a non-potent polysiloxane-polyether copolymer cell regulator.

2. The composition of claim 1 wherein the surface active agent comprises a silicone surfactant.

3. The composition of claim 1 wherein the surface active agent comprises a non-silicone surfactant.

4. The composition of claim 1 wherein the blowing agent is selected from the group consisting of methyl formate, ethyl formate and mixtures thereof.

5. The composition of claim 1 wherein the blowing agent is methyl formate.

6. The composition of claim 1 wherein the ratio of cell regulator to blowing agent is in the range of from about 95:5 to about 99:1.

7. The composition of claim 1 wherein the polyol comprises from about 50 percent to about 60 percent of the composition; the isocyanate component comprises from about 40 percent to about 50 percent of the composition and the blowing agent component comprises from about 1 percent to about 15 percent of the composition.

8. The composition of claim 1 wherein the polyol component further comprises a flame retardant or mixture of flame retardants.

9. The composition of claim 1 wherein the ratio of the polyol component to the blowing agent component is about 3 to 1.

10. A method for the preparation of an integral skin foam composition comprising (a) mixing a silicone surfactant, an isocyanate component and a blended polyol component, and (b) combining the mixture of (a) with a blowing agent component comprising a blowing agent and a non-potent polysiloxane-polyether copolymer cell regulator.

11. The method of claim 10 wherein the blowing agent is selected from the group consisting of methyl formate, ethyl formate and mixtures thereof.

12. The method of claim 10 wherein the blowing agent is methyl formate.

13. The composition of claim 10 wherein the ratio of cell regulator to blowing agent is in the range of from about 95:5 to about 99:1.

14. The method of claim 10 wherein the polyol comprises from about 50 percent to about 60 percent of the composition; the isocyanate component comprises from about 40 percent to about 50 percent of the composition and the blowing agent component comprises from about 1 percent to about 15 percent of the composition.

15. The method of claim 10 wherein the polyol component further comprises a flame retardant or mixture of flame retardants.

16. The method of claim 10 wherein the ratio of the polyol component to the blowing agent component is about 3 to 1.

17. A method for the preparation of an integral skin foam composition comprising (a) mixing a silicone surfactant, an isocyanate component and a blowing agent component comprising a blowing agent and a non-potent polysiloxane-polyether copolymer cell regulator, and (b) combining the mixture of (a) with a blended polyol component.

18. The method of claim 17 wherein the blowing agent is selected from the group consisting of methyl formate, ethyl formate and mixtures thereof.

19. The method of claim 17 wherein the blowing agent is methyl formate.

20. The method of claim 17 wherein the ratio of cell regulator to blowing agent is in the range of from about 95:5 to about 99:1.

21. The method of claim 17 wherein the polyol comprises from about 50 percent to about 60 percent of the composition; the isocyanate component comprises from about 40 percent to about 50 percent of the composition and the blowing agent component comprises from about 1 percent to about 15 percent of the composition.

22. A method for the preparation of an integral skin foam composition comprising (a) mixing a silicone surfactant, a blended polyol component and a blowing agent component comprising a blowing agent and a non-potent polysiloxane-polyether copolymer cell regulator, and (b) combining the mixture of (a) with an isocyanate component.

23. The method of claim 22 wherein the blowing agent is selected from the group consisting of methyl formate, ethyl formate and mixtures thereof.

24. The method of claim 22 wherein the blowing agent is methyl formate.

25. The method of claim 22 wherein the ratio of cell regulator to blowing agent is in the range of from about 95:5 to about 99:1.

26. The method of claim 22 wherein the polyol comprises from about 50 percent to about 60 percent of the composition; the isocyanate component comprises from about 40 percent to about 50 percent of the composition and the blowing agent component comprises from about 1 percent to about 15 percent of the composition.

27. The method of claim 22 wherein the polyol component further comprises a flame retardant or mixture of flame retardants.

28. In a composition for an integral skin foam composition which comprises: an isocyanate composition component; a blended polyol component; a surface active agent, and a blowing agent component which comprises a non-potent polysiloxane-polyether copolymer cell regulator and a methyl formate blowing agent, and the ratio of cell regulator to blowing agent is in the range of from about 95:5 to about 99:1 and wherein the method for the preparation of the integral skin foam composition comprises a). mixing a silicone surfactant, an isocyanate component and a blended polyol component, and b.) combining the mixture of (a.) With a blowing agent component comprising a blowing agent and a non-potent polysiloxane-polyether copolymer cell regulator.

* * * * *